United States Patent [19]

Looper et al.

[11] Patent Number: 5,023,999

[45] Date of Patent: Jun. 18, 1991

[54] UNITIZED TOOL CONSTRUCTION

[75] Inventors: Timothy J. Looper; James R. Sistare, both of Pickens, S.C.

[73] Assignee: Ryobi Motor Products Corp., Pickens, S.C.

[21] Appl. No.: 565,251

[22] Filed: Aug. 9, 1990

[51] Int. Cl.[5] .......... B23D 45/16

[52] U.S. Cl. .......... 30/390; 30/376

[58] Field of Search .......... 30/374–377, 30/388, 389–394, 500, 180, 228, 272.1, 273–275, 277.4

[56] References Cited

U.S. PATENT DOCUMENTS

| | | | |
|---|---|---|---|
| 2,989,995 | 6/1961 | Happe | 30/391 |
| 3,456,696 | 7/1969 | Gregory et al. | 143/43 |
| 4,971,122 | 11/1990 | Sato et al. | 30/376 |

*Primary Examiner*—Douglas D. Watts

*Attorney, Agent, or Firm*—David L. Davis

[57] ABSTRACT

A construction for a circular saw wherein the two parts of the clamshell housing are secured directly to the motor assembly from different respective sides thereof.

9 Claims, 4 Drawing Sheets

UNITIZED TOOL CONSTRUCTION

BACKGROUND OF THE INVENTION

This invention relates to the construction of a motor driven tool and, more particularly, to such a construction which provides ease of assembly and added stability and rigidity for the tool.

Motor driven tools are typically constructed with a two part clamshell type housing wherein the motor fits within recesses molded as part of the interior of the housing, the attachment together of the two parts of the housing acting to secure the motor therein. This form of construction suffers from a number of disadvantages, among which is the relatively loose containment of the motor in the housing. Such loose containment leads to a certain amount of instability for the overall tool.

It is therefore a primary object of this invention to provide a tool construction which results in enhanced stability and rigidity of the tool.

SUMMARY OF THE INVENTION

The foregoing and additional objects are attained in accordance with the principles of this invention by providing a power tool comprising a motor assembly, a two part housing, and means for securing each part of the two part housing to the motor assembly from a different respective side thereof.

In accordance with an aspect of this invention, the motor assembly includes a plurality of parts assembled together and the securing means secures each part of the two part housing to the same part of the motor assembly.

In accordance with another aspect of this invention, the motor assembly includes a field subassembly, an armature subassembly including an armature shaft, a fan mounted on one end of the armature shaft, a bearing support member holding the other end of the armature shaft, a fan shroud, and motor assembly securing means for securing the bearing support member to one end of the field subassembly and the fan shroud to the other end of the field subassembly, and the part of the motor assembly to which the housing parts are secured is the fan shroud.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
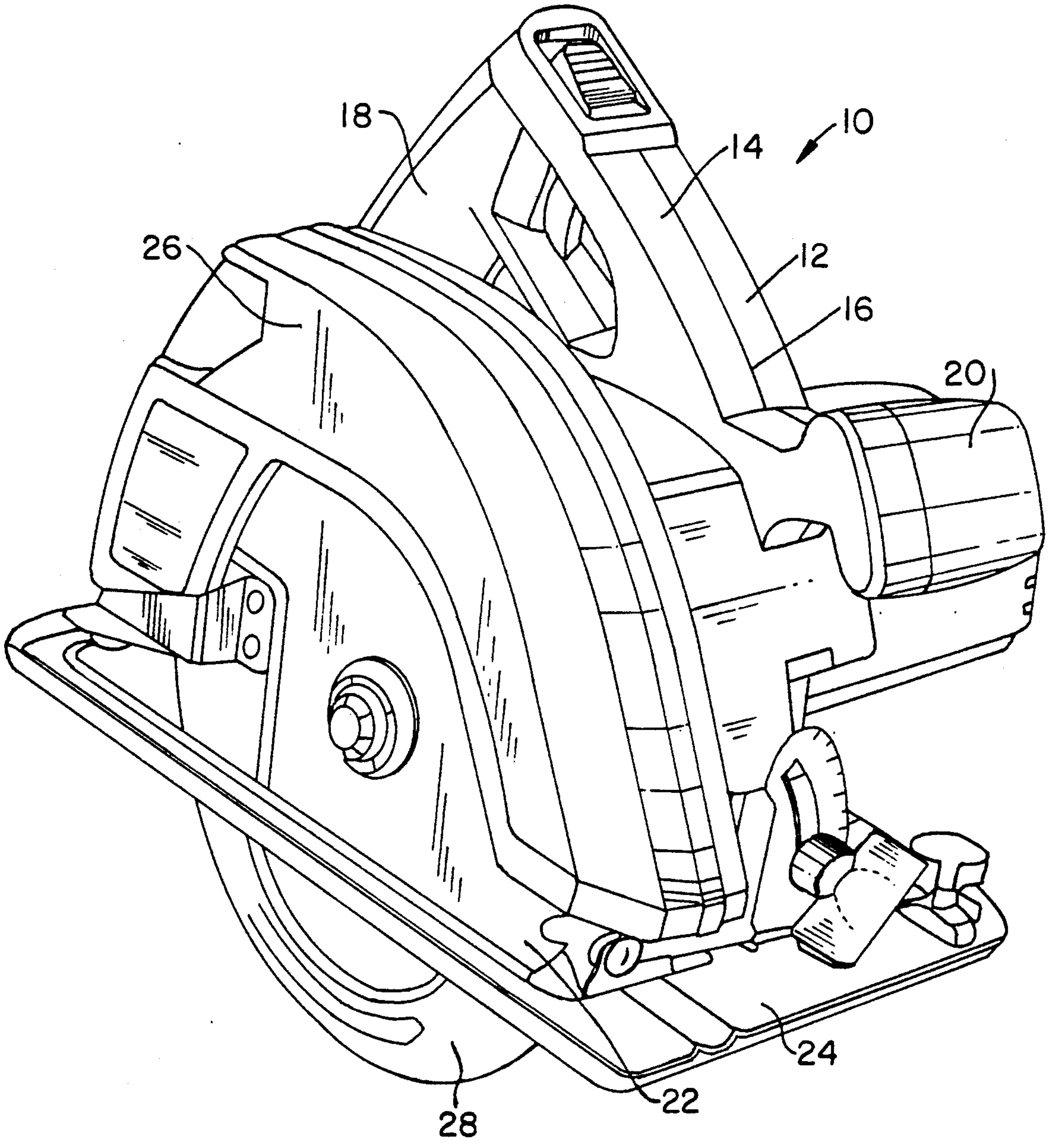
FIG. 1 is a perspective view of a Circular saw constructed according to this invention.
Figure 2:
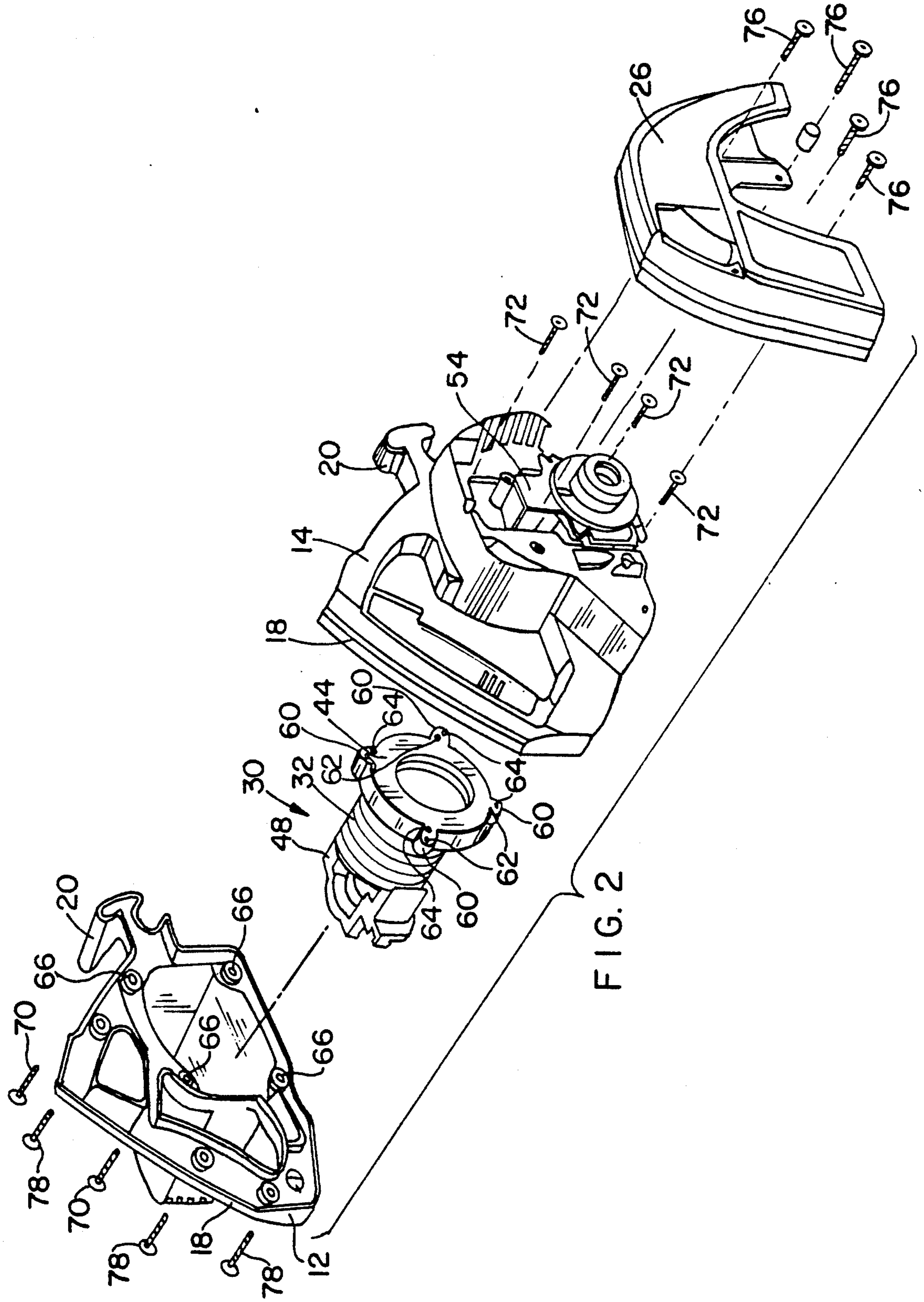
FIG. 2 is an exploded perspective view of the saw of FIG. 1.

Referring to the drawings, FIG. 1 shows a circular saw, designated generally by the reference numeral 10, which is constructed according to this invention. Externally, the circular saw 10 appears to be of conventional construction and includes a two part clamshell type housing 12, 14 meeting along a parting line 16, which parting line 16 lies substantially along a plane. The housing parts 12, 14 when assembled together form a hollow housing which holds the motor, gearing and output spindle of the circular saw 10. The two part housing 12, 14 forms a main rear handle 18 and a forward auxiliary handle 20. As is conventional, a circular saw blade 22 is mounted on the output spindle and the housing is mounted on a base 24 for supporting the saw 10 on a work piece to be cut thereby. To protect the user, a fixed upper blade guard 26 is mounted on the housing and a lower blade guard 28 is supported for pivoting motion about the axis of the output spindle.

Figure 3:
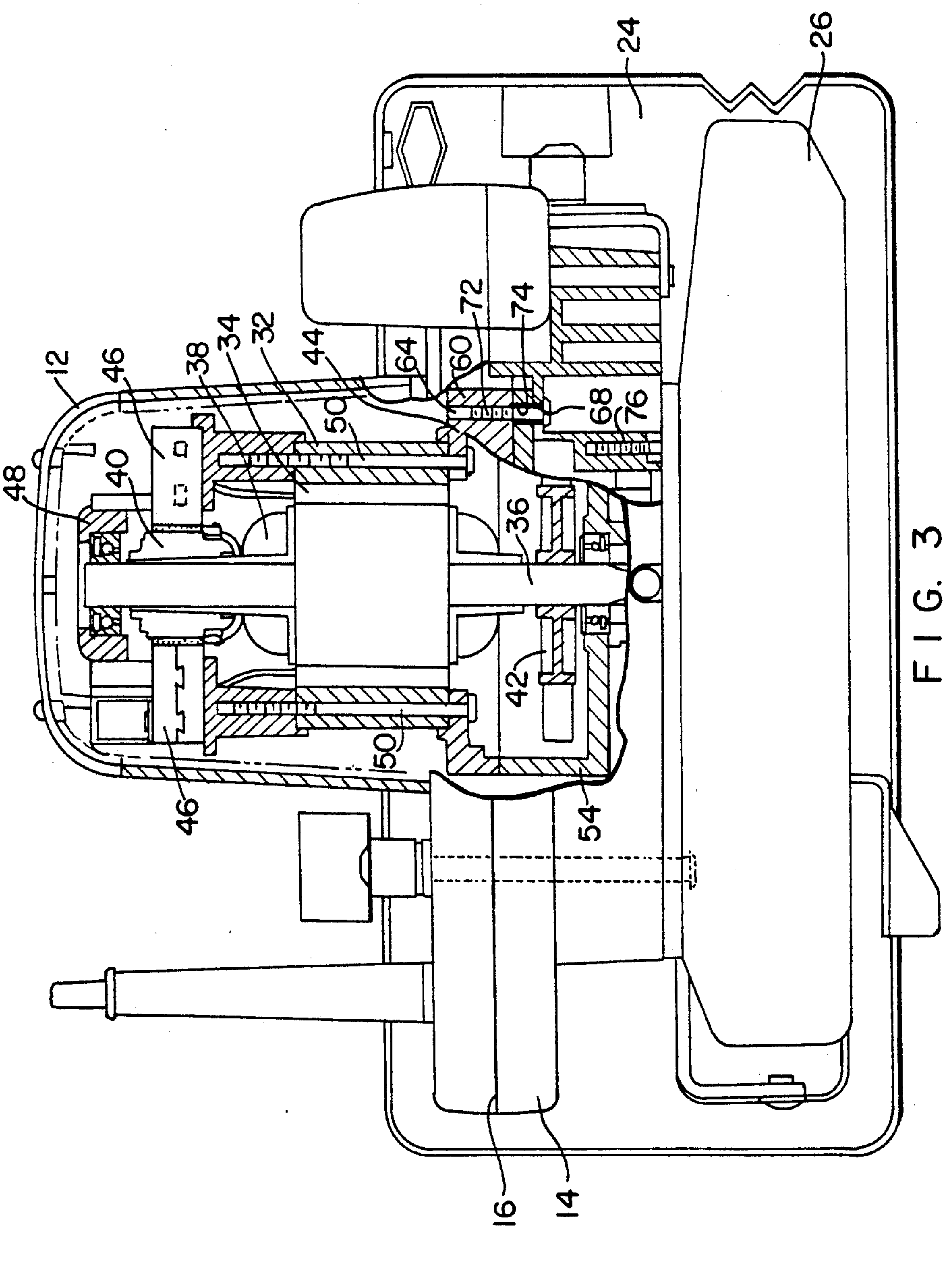
FIG. 3 is a partially sectioned top view of the saw shown in FIG. 1.
Figure 4:
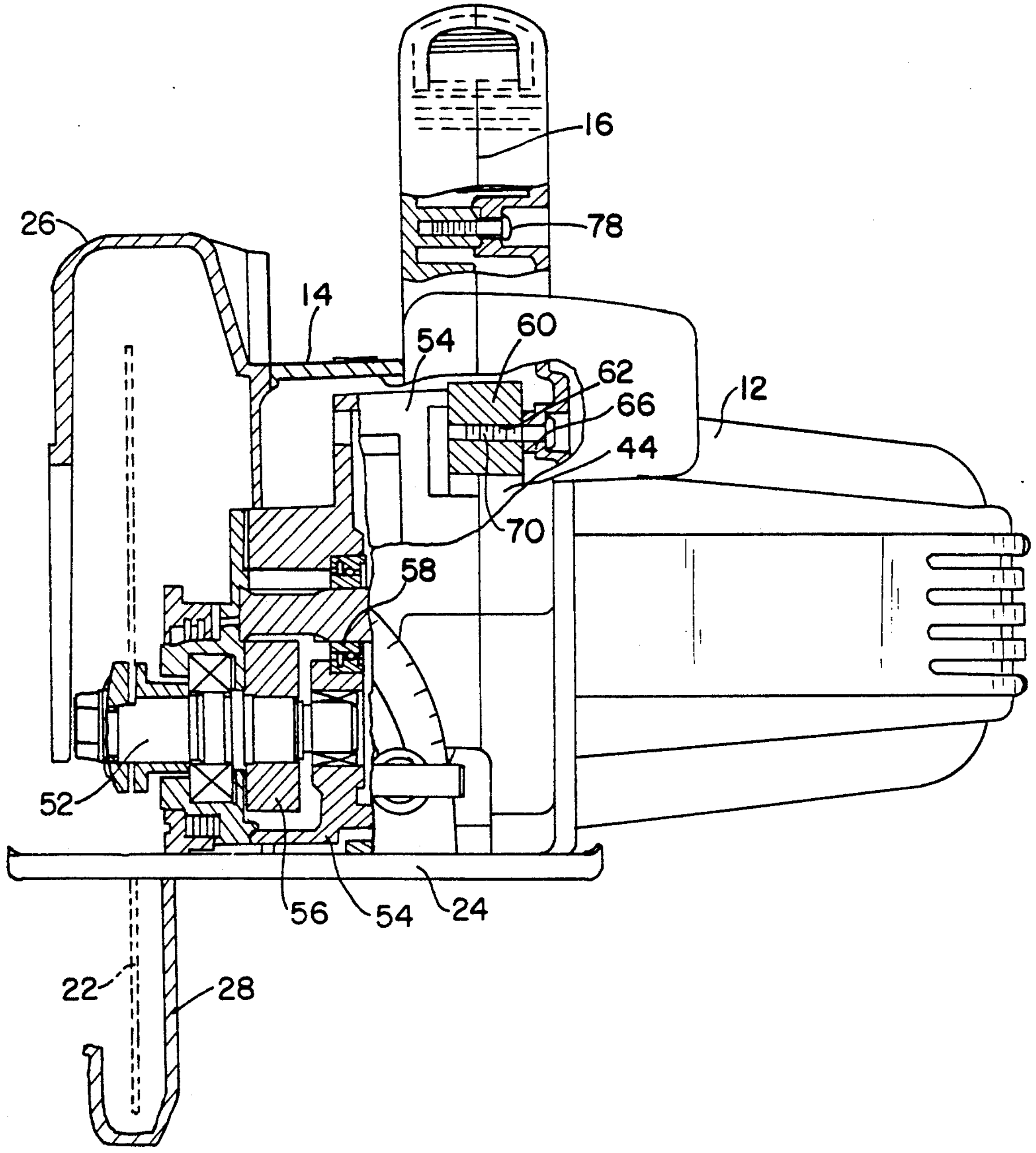
FIG. 4 is a partially sectioned side view of the saw shown in FIG. 1.

The circular saw 10 includes a motor assembly 30 which is an integral part of the overall construction of the circular saw. The motor assembly 30 includes a field subassembly having a laminated stack 32 and a field winding 34 supported on the stack 32. The motor assembly 30 also includes an armature subassembly including an armature shaft 36, an armature winding 38 supported on the shaft 36, a commutator 40 electrically coupled to the winding 38 and supported on the shaft 36 adjacent a first end of the shaft, and a fan 42 supported on the shaft 36 adjacent its other end. The motor assembly 30 also includes a molded fan shroud 44. The motor assembly 30 further includes a pair of brushes held in brush tubes 46, which in turn are supported on a unitary bearing support and brush tube holder member 48. The stack 32 is formed with a pair of diametrically opposed through-bores parallel to the armature shaft 36, the fan shroud 44 is formed with a pair of through-bores each colinear with the respective one of the stack through-bores, and the motor assembly 30 is held together by a pair of elongated threaded screws 50 which extend through respective sets of the through-bores of the fan shroud 44 and the stack 32 for engagement with the member 48, as is clearly shown in FIG. 3.

To couple the armature shaft 36 to the output spindle 52 of the circular saw 10, to which the blade 22 is attached in a conventional manner, there is provided a gear train contained within a gear housing 54. Thus, the end of the armature shaft 36 beyond the fan 42 is formed as a pinion gear that meshes with the gear 56 on the output spindle 52. The gear housing 54 also functions to hold a bearing 58 for the armature shaft 36.

According to this invention, enhanced stability and rigidity of the circular saw 10 is attained by securing the housing parts 12, 14 both to the fan shroud 44. Accordingly, the fan shroud 44 is formed with four substantially equiangularly displaced ears 60, each of which has a pair of bores 62, 64 parallel to the axis of the armature shaft 36. The housing part 12 is formed with openings 66 aligned with the bores 62 and the housing part 14 is formed with openings 68 aligned with the bores 64. Screws 70 extend through the openings 66 and engage the bores 62 of the fan shroud 44 and screws 72 extend through the openings 68 and engage the bores 64 of the fan shroud 44. The screws 70, 72 are parallel to the armature shaft 36. Further, the gear housing 44 is formed with through-bores 74 aligned with the bores 64. The screws 72, after passing through the openings 68 in the housing part 14, also pass through the bores 74 of the gear housing 54 so that the gear housing 54 is sandwiched between the housing part 14 and the fan shroud 44.

To provide additional rigidity to the construction of the circular saw 10, the fixed upper blade guard 26, which is typically formed of cast aluminum in contrast to the molded plastic housing parts 12, 14, is secured to the gear housing 54, as well as to the housing part 14, by one or more of the screws 76. To complete the assembly of the circular saw 10, the screws 78 secure together peripheral regions of the housing parts 12, 14, such as the main rear handle 18 and the forward auxiliary handle 20.

Accordingly, there has been disclosed an improved tool construction which provides ease of assembly and enhanced stability and rigidity for the tool. While an illustrative embodiment of the present invention has been disclosed herein, it will be apparent to those of ordinary skill in the art that various modifications and adaptations to that embodiment are possible and it is only intended that the present invention be limited by the scope of the appended claims.

We claim:

1. A motor driven appliance, comprising:

a two part clamshell type housing, the two housing parts meeting substantially along a plane and forming a hollow housing;

a motor assembly including a field subassembly, an armature subassembly including an armature shaft, a fan mounted on one end of said armature shaft, a bearing support member holding the other end of said armature shaft, a fan shroud, and motor assembly securing means for securing said bearing support member to one end of said field subassembly and said fan shroud to the other end of said field subassembly;

first securing means for securing a first of said housing parts to said fan shroud; and second securing means for securing the second of said housing parts to said fan shroud.

2. The appliance according to claim 1 wherein said fan shroud is formed with first and second bores parallel to said armature shaft, said first securing means includes an elongated threaded fastening member extending parallel to said armature shaft through said first housing part and engaging the first fan shroud bore, and said second securing means includes an elongated threaded fastening member extending parallel to said armature shaft through said second housing part and engaging the second fan shroud bore.

3. The appliance according to claim 2 further including a gear housing containing a gear train coupled to said armature shaft, said gear housing being situated adjacent said fan shroud and having a through-bore colinear with the first fan shroud bore, wherein said elongated threaded fastening member of said first securing means extends through the gear housing through-bore to sandwich said gear housing between said first housing part and said fan shroud.

4. The appliance according to claim 1 wherein said field subassembly includes a laminated stack and a field winding supported on said stack, said stack being formed with a pair of diametrically opposed through-bores parallel to said armature shaft, said fan shroud being formed with a pair of through-bores each colinear with a respective one of the stack through-bores, and said motor assembly securing means includes a pair of elongated threaded fastening members extending through respective sets of the through-bores of said fan shroud and said stack and engaging said bearing support member.

5. A power tool comprising:

a motor assembly including a field subassembly, an armature subassembly including an armature shaft, a fan mounted on one end of said armature shaft, a bearing support member holding the other end of said armature shaft, a fan shroud, and motor assembly securing means for securing said bearing support member to one end of said field subassembly and said fan shroud to the other end of said field subassembly;

a two part housing; and means for securing each part of the two part housing to the fan shroud from a different respective side thereof.

6. The power tool according to claim 5 wherein said field subassembly includes a laminated stack and a field winding supported on said stack, said stack being formed with a pair of diametrically opposed through-bores parallel to said armature shaft, said fan shroud being formed with a pair of through-bores each colinear with a respective one of the stack through-bores, and said motor assembly securing means includes a pair of elongated threaded fastening members extending through respective sets of the through-bores of said fan shroud and said stack and engaging said bearing support member.

7. The power tool according to claim 5 wherein said fan shroud is formed with first and second bores parallel to said armature shaft, said first securing means includes an elongated threaded fastening member extending parallel to said armature shaft through said first housing part and engaging the first fan shroud bore, and said second securing means includes an elongated threaded fastening member extending parallel to said armature shaft through said second housing part and engaging the second fan shroud bore.

8. The power tool according to claim 7 further including a gear housing containing a gear train and associated output spindle coupled to said armature shaft, said gear housing being situated adjacent said fan shroud and having a through-bore colinear with the first fan shroud bore, and wherein said elongated threaded fastening member of said first securing means extends through the gear housing through-bore to sandwich said gear housing between said first housing part and said fan shroud.

9. The power tool according to claim 8 wherein said tool is a circular saw further including a rotating saw blade coupled to said output spindle, a fixed upper blade guard, and means for securing said fixed upper blade guard to said gear housing.

* * * * *